United States Patent

[11] 3,584,771

| | | |
|---|---|---|
| [72] | Inventor | Katsuhiko Wakamatsu<br>5-g0, 10-ban, 2 chome Momoi, Suginami-ku, Tokyo-to, Japan |
| [21] | Appl. No. | 750,266 |
| [22] | Filed | Aug. 5, 1968 |
| [45] | Patented | June 15, 1971 |
| [32] | Priority | Mar. 29, 1968 |
| [33] | | Japan |
| [31] | | 43/20062 |

[54] CONTAINER WITH MEANS FOR DISPENSING A FIXED QUANTITY OF MATERIAL
5 Claims, 4 Drawing Figs.

[52] U.S. Cl. .................................................. 222/457
[51] Int. Cl. ............................................... G01f 11/26
[50] Field of Search ........................................ 222/457,
547, 166, 462, 564, 454, 455; 206/42

[56] References Cited
UNITED STATES PATENTS

| 58,157 | 9/1966 | Weaver | 222/564 X |
|---|---|---|---|
| 352,195 | 11/1886 | Krag | 222/457 |
| 1,640,583 | 8/1927 | Steinruck | 222/457 |
| 1,859,109 | 5/1932 | Oswell | 222/455 |
| 3,235,144 | 2/1966 | Pitkin et al. | 222/455 |
| 3,353,725 | 11/1967 | Caceres | 222/564 X |

Primary Examiner—Samuel F. Coleman
Assistant Examiner—Norman L. Stack, Jr.
Attorney—Ernest G. Montague ABSTRACT: A container comprising a main chamber for receiving therein materials to be consumed and a measuring chamber for dispensing a fixed quantity of materials such that when this container is supported in a upside-down position, the materials contained in the main chamber flow downwardly and fill up the measuring chamber. The container is, then laid on its side, whereupon only a fixed quantity of materials maintained within the measuring chamber is discharged out of the measuring chamber by gravity.

PATENTED JUN 15 1971
3,584,771
SHEET 1 OF 2
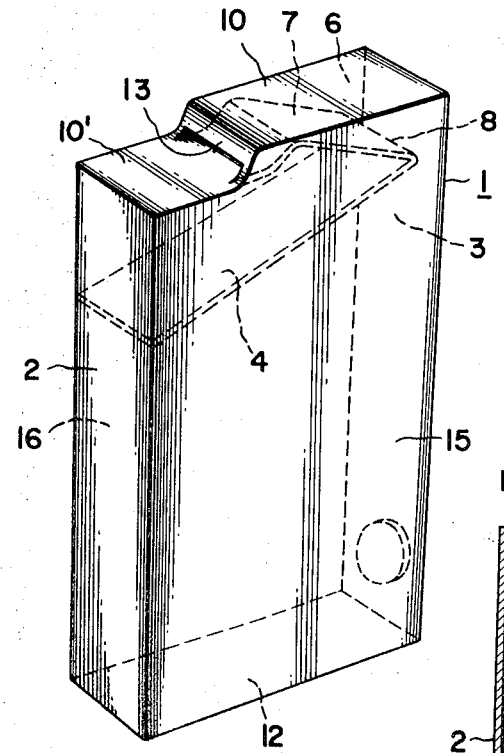
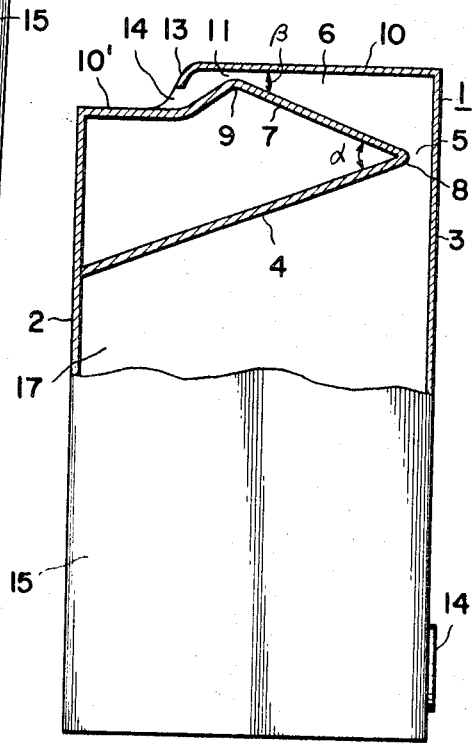
INVENTOR.
Katsuhiko Nakamatsu
BY Ernest Montague
Attorney

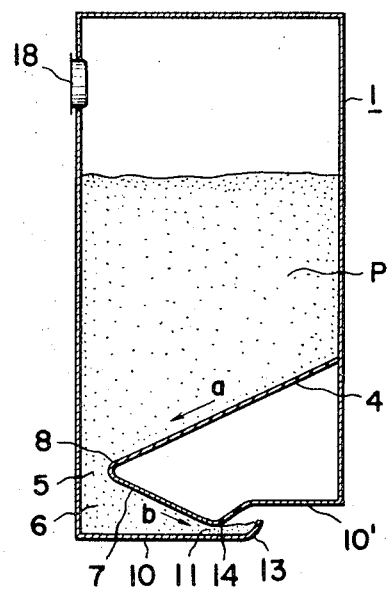
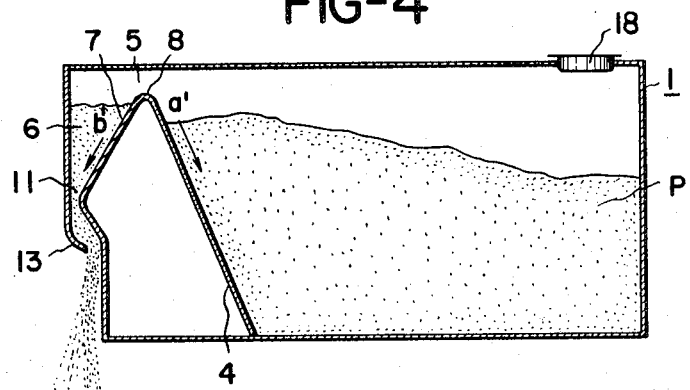

CONTAINER WITH MEANS FOR DISPENSING A FIXED QUANTITY OF MATERIAL

The present invention relates to a container provided with means for dispensing a fixed quantity of powdery or granular materials such as sugar, salt, condiments, cleanser, chemicals or the like, as well as liquid or oily materials.

It is an object of the present invention to provide a container or shaker which makes it possible to automatically measure and shake out a predetermined quantity of materials without the aid of a spoon or the like.

It is another object of the present invention to provide a container or shaker which is sanitary and easy to handle.

It is a further object of the present invention to provide a container with means for dispensing a fixed quantity of materials, comprising a main chamber to receive therein materials to be consumed, a measuring chamber arranged immediately above the main chamber, a throat to communicate the main chamber with the measuring chamber, the measuring chamber having a first slant wall which converges downwardly and terminates at the lower end at the throat, the main chamber having a second slant wall which converges upwardly and terminates at the upper end at the throat, and a laterally opened throat provided at the uppermost end of the first slant wall of the measuring chamber to discharge a fixed quantity of materials out of the measuring chamber.

With these and other objects in view, which will become apparent in the following detailed description, the present invention, which is disclosed by example only, will be clearly understood in connection with the accompanying drawings, in which:

FIG. 1 is a perspective view of a container designed according to the present invention;

FIG. 2 is a front elevation view of the container of FIG. 1, broken away in part to show essential parts thereof;

FIG. 3 is a longitudinal section of the container showing the container contents when the latter is turned upside down, constituting the measuring stage; and FIG. 4 is a longitudinal section of the container when moved from the FIG. 3 position into a side-lying position constituting the discharge stage of the container of FIGS. 1 and 2.

Referring now to the drawings, and more particularly to FIGS. 1 and 2, a container 1, designed in accordance with the present invention, is of substantially pillar shape comprising a bottom wall 12, two pairs of spaced, opposed parallel sidewalls 2, 3 and 15, 16, and a stepped top wall, the latter including a first top portion 10 and a second top portion 10' which are vertically offset relative to each other to form therebetween a laterally opened aperture 14, constituting a discharge opening. The first or upper top wall 10 terminates in a downwardly directed lip portion 13 which defines the upper traverse edge of the aperture 14. The lip portion 13 serves as a temporary dam preventing materials from running out, as will be hereinafter described. The second or lower top portion 10' extends immediately below the first top portion 10 in underlying relationship to the latter, then upwardly until a raised end point 9 thereof reaches in proximity of the lowest or inner surface of the first top portion 10. This extension of the second top portion 10', then, at the point 9, undergoes a dull change in direction at an angle $\beta$ to the first top portion 10 so that a narrow traverse spacing or throat 11 is provided between the lowest surface of the first top portion 10 and the raised end point 9, and thereafter the lower top portion 10 extends downwardly in an inclined manner to form a first slant wall 7. The first slant wall 7 extends to a folded edge 8 in the proximity of the inner surface of the sidewall 3, and is then folded back at angle of $\alpha$ with respect to the first slant wall 7 so that a narrow spacing or throat 5 is provided between the folded edge 8 and the inner surface of the sidewall 3. From the edge 8 the slant wall further extends downwardly inwardly toward the opposite sidewall 2 to thereby form a second slant wall 4. The free end of this second slant wall 4 is engaged closely or secured to the wall 2.

It will be understood that both of traversely opposed edges of the point 9, the first slant wall 7, the folded edge 8 and the second slant wall 4 are engaged closely or welded to the inner surfaces of their associated sidewalls for substantially preventing materials from leaking through therebetween.

From the foregoing, it will be thus apparent that the first top portion 10, the sidewall 3, the other pair of opposed parallel sidewalls 15, 16 and the first slant wall 7 define a measuring chamber 6 having a predetermined volume. On the other hand, all of the bottom wall 12, the two pairs of opposed sidewalls 2, 3 and 15, 16 and the second slant wall 4 define a main chamber 17. Provided between the lowest surface of the top portion 10 and the upper surface of the ridge portion 9 is the traversely extending narrow opening or throat 11 for discharging materials contained in the measuring chamber 6. Also provided between the sidewall 3 and the folded edge 8 is the similar throat 5 whereby materials contained in the main chamber 17 pass into the measuring chamber 6.

It will be understood that, although all of the ridge portion 9, the first slant wall 7 and the second slant wall 4 are heretofore described as being formed integral with one another, they may be formed in an assembly manner. It will be noted that the second slant wall 4 may be adequately curved or bent to enlarge the main chamber 17 in volume, and that the container 1 may be divided into upper and lower halves which may be assembled to each other by means of hinges or the like (not shown). Further, a substantially triangular cavity defined by both of the first and second slant walls 4 and 7 will be available for receiving therein hygroscopic materials or the like. It will be apparent by those skilled in the art that the angles $\alpha$ and $\beta$ as well as the size of the throat 5 and 11 are selected with respect to the properties of materials to be consumed and the amount consumed at a time. In addition, an inlet port 18 is provided near the bottom of the present container 1.

To use the present container constructed as described above, materials such as salt, sugar, cleanser and the like are previously supplied into the main chamber 17 thereof. In operation, the container 1 is first supported in an upside down position, as shown in FIG. 3, whereupon the material contained in the main chamber 17 flows downwardly on the second slant wall 4 in the direction of an arrow $a$, and passes through the throat 5, and finally fills up the measuring chamber 6. The material filling up the measuring chamber 6 is preferably locked or maintained at the throat 11 rather than running out of the chamber 6 through the throat 11 because the load due to the weight of material in the container 1 is substantially applied against the inner surface of the first top portion 10, and also the force thrusting the material towards the throat 11 is extremely week. In liquid or oily material, it will be understood that the surface tension of material at the throat 11 will contribute to lock or hold the material within the measuring chamber 6. The preceding part of material filling up the measuring chamber 6, of course, will issue from the measuring chamber 6 through the throat 11 but does not rush out of the aperture 14 because the lip portion 13 serves as a dam.

After the measuring chamber 6 has been filled with a fixed quality of material, the container 1 is brought into a position where it is laid on its side with the aperture 14 thereof being directed downwardly, as shown in FIG. 4, whereupon the predetermined quantity of material in; the measuring chamber 6 flows downwardly on the first slant wall 7 in the direction shown by an arrow $b$ and is forced out of the chamber 6 through the throat 11 and the aperture 14 by gravity. The residual quantity of material in the main chamber 17 flows down in the direction shown by an arrow $a'$. It will be thus understood from the foregoing that a fixed quantity of material may be removed from the present container whenever the container is turned upside-down and then subsequently timed on its side with its laterally opened throat being directed downwardly.

Although the container 1 has been heretofore described, formed in the shape of rectangular pillar, the present container 1 may take different shapes such as a triangular or cylindrical pillar.

While I have disclosed several embodiments of the present invention, it is to be understood that these embodiments are given by example only and not in a limiting sense.

I claim:
1. A container with means for dispensing a fixed quantity of materials, comprising
 a main chamber to receive therein materials to be consumed,
 a measuring chamber arranged immediately above said main chamber and having a discharge opening,
 a throat to communicate said main chamber with said measuring chamber,
 said measuring chamber having a top wall and two upper portions of opposed sidewalls extending from both sides thereof and a top portion of a first sidewall depending from and between said two opposed sidewalls and a first slant wall which converges downwardly in a direction away from said top wall and away from said discharge opening toward said first sidewall and terminates at its lower end at said throat,
 said main chamber having a bottom wall, a second sidewall between lower portions of said two opposed sidewalls, and a lower portion of said first sidewall, and said discharge opening being laterally opened and located adjacent the uppermost end of said first slant wall of said measuring chamber to discharge a fixed quantity of materials out of said measuring chamber and including means for preventing material from passing out of said discharge opening while said measuring chamber receives material from said main chamber.

2. The container, as set forth in claim 1, wherein said discharge opening including said means has an upper edge and a horizontal extension, the free end of said upper edge is bent downwardly.

3. The container, as set forth in claim 1, wherein said discharge opening is arranged in traversely opposed relation with the throat communicating said main chamber with said measuring chamber.

4. The container as set forth in claim 2, wherein said downwardly bent upper edge constitutes a lip portion extending downwardly from said top portion by a distance greater than the closest distance of said first slant wall from said top portion.

5. The container as set forth in claim 1, wherein said main chamber includes a second slant wall which converges upwardly and in a direction towards said throat and terminates at its upper end at said throat, and cooperates with said first slant wall to form a folded wall portion therewith.